M. WAGNER.

LAMP-EXTINGUISHERS.

No. 7,256. Reissued Aug. 8, 1876.

*Attest:*

Francis McArdle.

John Goethals

*Inventor:*

M. Wagner

By

Munn & Co.

Attorneys.

N. PETERS, PHOTO-LITHOGRAPHER, WASHINGTON, D. C.

UNITED STATES PATENT OFFICE.

MICHAEL WAGNER, OF QUINCY, ILLINOIS.

IMPROVEMENT IN LAMP-EXTINGUISHERS.

Specification forming part of Letters Patent No. 179,373, dated June 27, 1876; reissue No. 7,256, dated August 8, 1876; application filed August 2, 1876.

*To all whom it may concern:*

Figure 1:
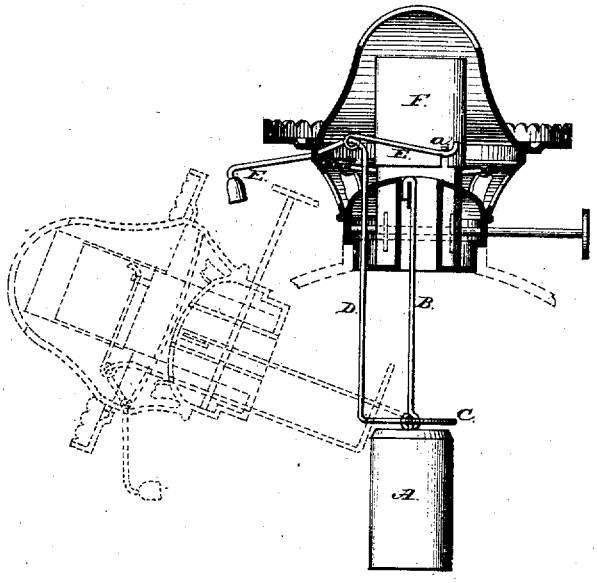
Figure 2:
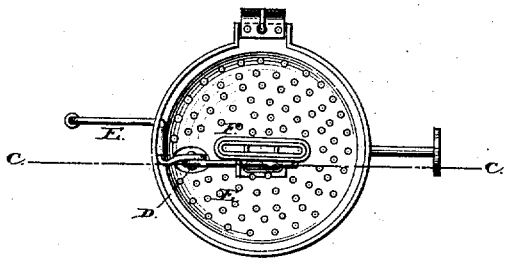

Be it known that I, MICHAEL WAGNER, of Quincy, Adams county, State of Illinois, have invented a new and Improved Lamp-Extinguisher, of which the following is a specification:

In the accompanying drawing, Figure 1 represents a side elevation, partly in section, on line *c c*, Fig. 2, of a lamp-burner with my improved lamp-extinguishing device; and Fig. 2, a top view of the same.

Similar letters of reference indicate corresponding parts.

My invention relates to certain improvements in the lamp-extinguishing device for which Letters Patent have been granted to me under date of June 23, 1874, and numbered 152,441, so that the construction of the extinguisher is simplified and made cheaper, and its operation more reliable and effective.

My invention consists of a vibrating weight, suspended within the bowl of a lamp, and actuating a disk or ring above the weight, and, by an upright connecting-rod, a weighted lever, that engages a pin or lug of an extinguisher-tube sliding over the wick-tube.

In the drawing, A represents a weight, that is suspended so as to vibrate at the lower end of a fixed rod, B, within the bowl of a lamp. A disk or ring, C, is arranged at such distance above the weight that it will not come in contact with the ring when the lamp is but slightly tipped, but will press on the same the moment when it is carried sufficiently out of its vertical position. The disk or ring C is connected by an upright rod, D, that passes up through a guide-hole of the base of the burner, with a fulcrumed and weighted lever, E, being pivoted to the same at some distance from the fulcrum. The weight of lever balances somewhat the disk or ring and the connecting-rod, for the purpose of facilitating the action of the lever as soon as the vibrating weight touches the ring or disk. The end of the lever opposite the weighted end is hook-shaped, and engages a pin or lip, *a*, of the extinguisher-tube F, that slides on the wick-tube. The lever E carries the extinguisher-tube to sufficient height above the wick-tube to extinguish the flame, as shown in dotted lines in Fig. 1, but prevents the tube from going up too high by the action of the hook end on the pin *a*. When the extinguisher-tube is in downward position it may be readily detached for cleaning without interfering with the lever E. The lamp is extinguished by the action of the weight and the simple connecting mechanism, which is, with little expense, applied to any burner, and serves to prevent, in effective and reliable manner, the danger of explosion and accidents in coal-oil lamps.

Having thus described my invention, what I claim as new, and desire to secure by Letters Patent, is—

The combination of a weight suspended from a fixed rod, B, with a ring, C, rod D, hook-lever E, and sliding tube F, all constructed and arranged substantially as and for the purpose specified.

MICHAEL WAGNER, M. D.

Witnesses:
GEO. J. WENER,
ALBERT SELLNER.